(12) United States Patent
Fan et al.

(10) Patent No.: US 7,983,419 B2
(45) Date of Patent: Jul. 19, 2011

(54) WIRELESS DEVICE TO NETWORK SERVER ENCRYPTION

(75) Inventors: Roderic C. Fan, Fremont, CA (US);
Anil Tiwari, Palo Alto, CA (US);
Ramakrishna Tumuluri, San Jose, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 791 days.

(21) Appl. No.: 09/927,928

(22) Filed: Aug. 9, 2001

(65) Prior Publication Data

US 2003/0031320 A1    Feb. 13, 2003

(51) Int. Cl.
*H04K 1/00* (2006.01)
(52) U.S. Cl. ........................................ 380/255
(58) Field of Classification Search .............. 713/160, 713/162, 151, 201; 380/33, 45, 247, 255, 380/258, 270
See application file for complete search history.

(56) References Cited

U.S. PATENT DOCUMENTS

| | | | | |
|---|---|---|---|---|
| 5,081,678 A * | 1/1992 | Kaufman et al. | ............ | 713/161 |
| 5,351,296 A * | 9/1994 | Sullivan | ............ | 705/70 |
| 5,455,865 A * | 10/1995 | Perlman | ............ | 713/153 |
| 5,548,646 A * | 8/1996 | Aziz et al. | ............ | 713/153 |
| 5,870,474 A * | 2/1999 | Wasilewski et al. | ............ | 380/211 |
| 5,970,143 A | 10/1999 | Schneier et al. | ............ | 380/23 |
| 6,035,039 A * | 3/2000 | Tisdale et al. | ............ | 380/249 |
| 6,055,314 A * | 4/2000 | Spies et al. | ............ | 380/228 |
| 6,330,671 B1 * | 12/2001 | Aziz | ............ | 713/163 |
| 6,501,767 B1 * | 12/2002 | Inoue et al. | ............ | 370/465 |
| 6,766,361 B1 | 7/2004 | Venigalla | | |
| 6,806,814 B1 * | 10/2004 | Iverson et al. | ............ | 340/825.49 |
| 6,970,564 B1 * | 11/2005 | Kubota et al. | ............ | 380/210 |
| 6,996,722 B1 * | 2/2006 | Fairman et al. | ............ | 713/192 |
| 7,590,741 B2 * | 9/2009 | Sumino et al. | ............ | 709/227 |
| 7,720,603 B2 * | 5/2010 | Park et al. | ............ | 701/213 |
| 2002/0004898 A1 * | 1/2002 | Droge | ............ | 713/151 |
| 2002/0019223 A1 * | 2/2002 | Lee et al. | ............ | 455/411 |
| 2002/0186693 A1 * | 12/2002 | Inoue et al. | ............ | 370/389 |
| 2003/0076782 A1 * | 4/2003 | Fortin et al. | ............ | 370/230.1 |
| 2003/0126455 A1 * | 7/2003 | Sako et al. | ............ | 713/193 |
| 2003/0167394 A1 * | 9/2003 | Suzuki et al. | ............ | 713/168 |
| 2006/0168451 A1 * | 7/2006 | Ishibashi et al. | ............ | 713/176 |
| 2007/0259655 A1 * | 11/2007 | Minborg et al. | ............ | 455/415 |

FOREIGN PATENT DOCUMENTS

| | | |
|---|---|---|
| WO | WO-03/060712 | 7/2003 |
| WO | WO-2004/114144 | 12/2004 |

OTHER PUBLICATIONS

Bruce Schneier, Applied Cryptography, 1996, Jon Wiley and Sons Inc., Second Edition, pp. 47-74, 31-34, 270.*

* cited by examiner

*Primary Examiner* — Emmanuel L Moise
*Assistant Examiner* — Tamara Teslovich (57) ABSTRACT

A system and method are disclosed for providing encryption of location data transmitted from a wireless device to a wireline network server. In one embodiment, the wireless device encrypts a payload, adds a header to the payload to form a data packet, encrypts the payload and the header of the data packet, and transmits the encrypted data packet.

20 Claims, 7 Drawing Sheets

WIRELESS DEVICE TO NETWORK SERVER ENCRYPTION

TECHNICAL FIELD

The present invention relates to data encryption, and more specifically, the present invention relates to a system and method for encrypting communications between a wireless device and a wireline network server.

BACKGROUND

In the past, wireless devices have communicated with network servers by transmitting data that traverses a wireless link from a wireless device to a base station, through a gateway, and over a wireline Wide Area Network (WAN) to a network server coupled to the WAN. Client computers on the WAN may then access the data from the network server over the WAN.

Conventionally, a wireless device packetizes the data to be transmitted and then encrypts the data packet before transmitting the data packet over a wireless link. The data packet encryption may be performed by using conventional wireless transmission systems including Cellular Digital Packet Data (CDPD). The CDPD wireless transmission system may employ RC4 (a well-known encryption method from RSA Data Security, Inc. of Redwood City, Calif.).

Encryption of the data packet before the data packet traverses the wireless link reduces the ability of unauthorized third parties to tamper, listen, or interfere with the transmission of the data packet over the wireless link. Indeed, encryption provides improved privacy in such wireless communications by reducing the ability of unauthorized third parties to intercept and read wireless transmissions. In particular, such encryption generally limits the ability of third-parties to intercept and listen to the transmitted data, intercept and modify the transmitted data, or to engage in a practice known in the art as "spoofing," whereby a third party gains unauthorized access to a network.

The network server also typically encrypts the data from the received data packet before transmitting the data over the WAN to the client computer to reduce the ability of third parties to gain unauthorized access to or to spoof the data. This encryption between the network server and the client computer may include the conventional security protocol SSL (Secure Sockets Layer).

The data is not, however, conventionally encrypted as the data traverses the WAN segment between the gateway and the network server. One reason the data is not typically encrypted between the gateway and the network server is due to the high overhead associated with use of protocols such as Wireless Transport Layer Security (WTLS). Thus, conventionally, data packets traversing the WAN between the gateway and the network server are either not encrypted or use a high-overhead encryption method, which may require considerable bandwidth.

Accordingly, a need exists to provide an efficient system and method for improved privacy, authentication, and encryption of data transmitted from a wireless device to a network server that spans wireless and wireline networks.

SUMMARY

A method for transmitting data is provided that includes encrypting a payload, adding a header to the payload to form a data packet, encrypting the payload and the header of the data packet so that the payload is at least twice-encrypted and the header is at least once-encrypted. The packet is then transmitted only after at least twice encrypting the payload.

In one embodiment, a wireless device generates a temporary session key, encrypts the temporary session key using a public key, and transmits the encrypted temporary session key to a wireline device, which receives and decrypts the encrypted temporary session key using a private key associated with the public key. The wireless device then encrypts a payload using the temporary session key, adds a header to form a data packet, and then encrypts the entire data packet using another key. The wireless device then transmits the encrypted data packet over a wireless link to a gateway device that decrypts the data packet to produce a data packet having a decrypted header and a payload encrypted by the temporary session key. The gateway device then forwards the data packet over a wireline network, such as a WAN, to the wireline device, which removes the header and decrypts the encrypted payload using the temporary session key.

Accordingly, the present system and method provide for fast, secure wireless device to wireline device communication. By providing encryption of the payload independent of other protocol layers, standard protocols may be employed to perform typical Internet Protocol functions such as data routing, segmentation, and the like. Moreover, since the encryption of the payload is limited to the payload, the encrypted payload can be used with a wide variety of underlying wireless network protocols. Further, encryption of the payload in accordance with the present system and method does not require significant extra overhead in the payload size, thus optimizing or efficiently using the wireless bandwidth. These and other aspects, features, and capabilities of the present invention will be apparent from a reading of the following detailed description and the accompanying drawings.

BRIEF DESCRIPTION OF THE DRAWINGS

In the various drawings of the exemplary embodiments, similar features of the various embodiments typically have the same reference numbers.

DETAILED DESCRIPTION

Figure 1:
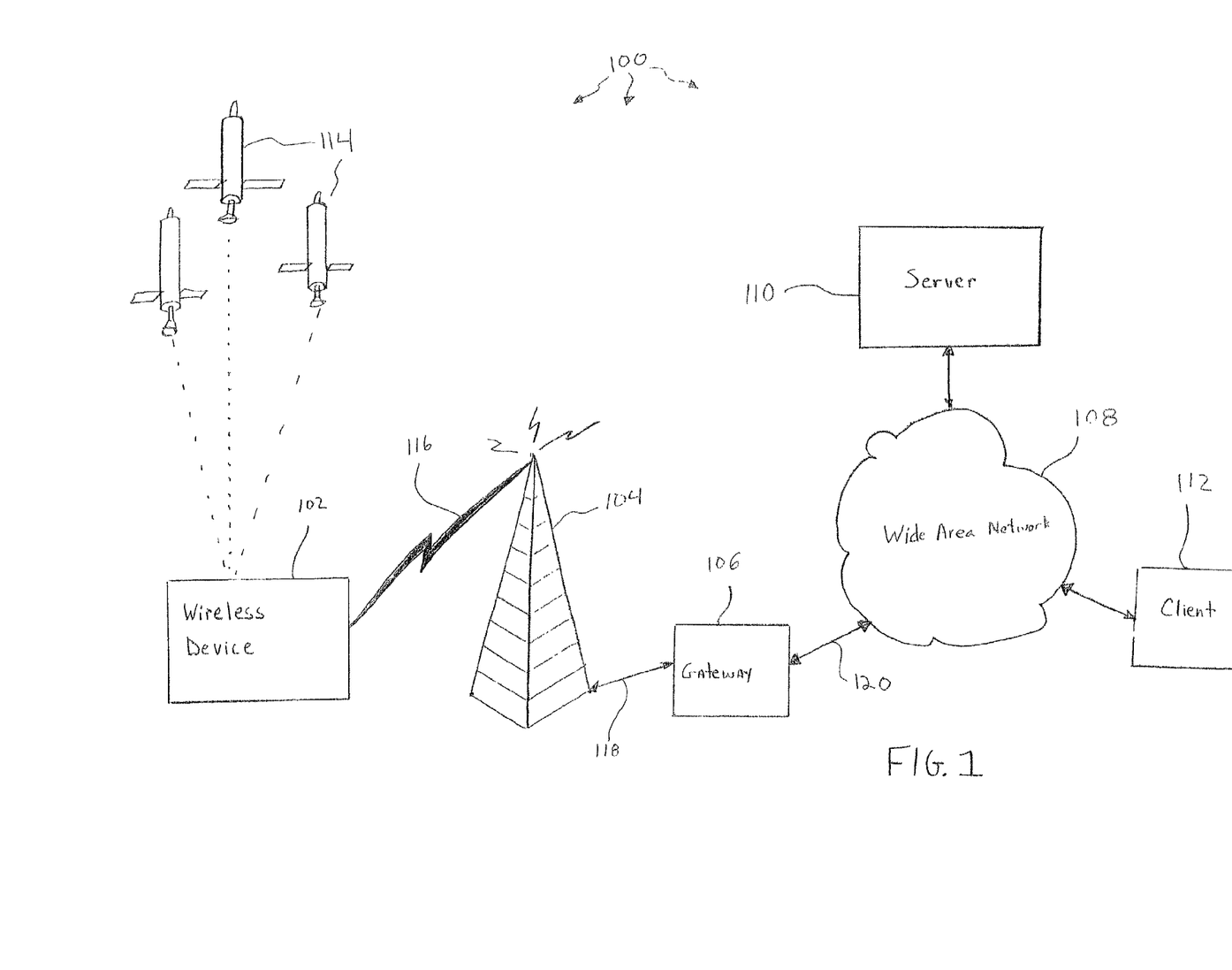
FIG. 1 is a block diagram of a data transmission system in accordance with one embodiment of the present invention.

FIG. 1 illustrates a data transmission system 100 in accordance with one embodiment of the present invention. The data transmission system 100 generally includes a wireless device 102, a base station 104, a gateway 106, a wide area network (WAN) 108, a wireline server 110, and a client 112. The system 100 may also include a satellites 114. In one embodiment, the WAN 108 comprises the Internet.

In this configuration, the wireless device 102 transmits a data packet over a wireless link 116 to the base station 104. The wireless device 102 may transmit the data packet using any of a variety of conventional protocols, including, for example, CDPD (Cellular Digital Packet Data), GSM (Global System for Mobile Communications), CDMA (Code Division Multiple Access), TDMA (Time Division Multiple Access), iDEN (Integrated Digital Enhanced Network), and the like.

The data packet transmitted may include location information regarding the geographical location of the wireless device 102 and may comprise data derived from information received from the satellites 114 in accordance with conventional Global Positioning System (GPS) techniques. The location information may alternatively comprise location information from techniques other than GPS, such as time difference of arrival (TOA), angle of arrival (AOA), ray tracing/pattern recognition, hybrid methods thereof, and the like.

As discussed in more detail below, the wireless device 102 encrypts a payload in accordance with a first encryption algorithm, using a first key, and adds a header to the payload to form a data packet. The wireless device 102 then encrypts the entire data packet, including the header and the payload, using a second key, in accordance with a second encryption algorithm before transmitting the encrypted data packet over the link 116. Additional details regarding the wireless device 102 are described below with reference to FIGS. 2 and 6.

The base station 104 receives the encrypted data packet from the wireless device 102 over the wireless link 116 and passes the received data packet to the gateway 106 over link 118, which may comprise any of a variety of conventional base station/gateway interface links. The link 118 may, therefore, comprise, for example, an Ethernet link, a frame relay link, or the like. In addition, those skilled in the art will appreciate that the base station 104 and the gateway 106 may alternatively comprise a single device having the functionality of the base station 104 and the gateway 106.

The gateway 106 is disposed between the base station 104 and the WAN 108 and is coupled to the WAN 108 by a link 120, which may comprise a TCP/IP or UDP/IP link, for example. The gateway 106 generally provides protocol conversion for data transmissions between the base station 104 and the WAN 108. The gateway 106 receives the encrypted data packet transmitted from the wireless device 102 via the link 116 and the base station 104. The gateway 106 then performs a first decryption of the header and payload of the data packet and forwards the data packet over the WAN 108 in accordance with the header information. In one embodiment, the gateway 106 may comprise a SPARC computer running the SOLARIS operating system from Sun Microsystems, Inc. of Palo Alto, Calif.

As discussed in more detail below, the data packet forwarded by the gateway 106 includes a payload encrypted by the wireless device 102. Therefore, the payload of the data packet transmitted by the gateway 106 traverses the WAN 108 from the gateway 106 to the server 110 in an encrypted form. Additional details of the gateway 106 are described below with reference to FIGS. 4 and 7.

The server 110 is coupled to the WAN 108 and receives the data packet forwarded by the gateway 106, removes the header, and decrypts the payload of the data packet. The server 110 may also authenticate the received data packet, perform cyclical redundancy checking (CRC), and process the received payload. In one embodiment, the server 110 checks the received payload to determine whether the payload matches at least one entry in a database. If the server 110 identifies at least one match, the server 110 forwards at least a portion of the payload information over the WAN 108 to the client 112, which may comprise one or more client computers. In one embodiment, the server 110 transmits the payload information to the client 112 using a conventional internet security protocol such as SSL (Secure Sockets Layer) or TSL (Transport Layer Security), for example. Additional details regarding the server 110 are discussed below with reference to FIGS. 3 and 7.

The client 112 is coupled to the WAN 108 by conventional means and may access payload information from the server 110. The client 112 may comprise one or more conventional personal computers. The client 112 may include a web browser, such as Internet Explorer® by Microsoft, Inc., to request and receive the payload information from the server 110. Thus, a user (not shown) at the client 112 may obtain information from the wireless device 102 in an efficient and secure manner.

Figure 2:
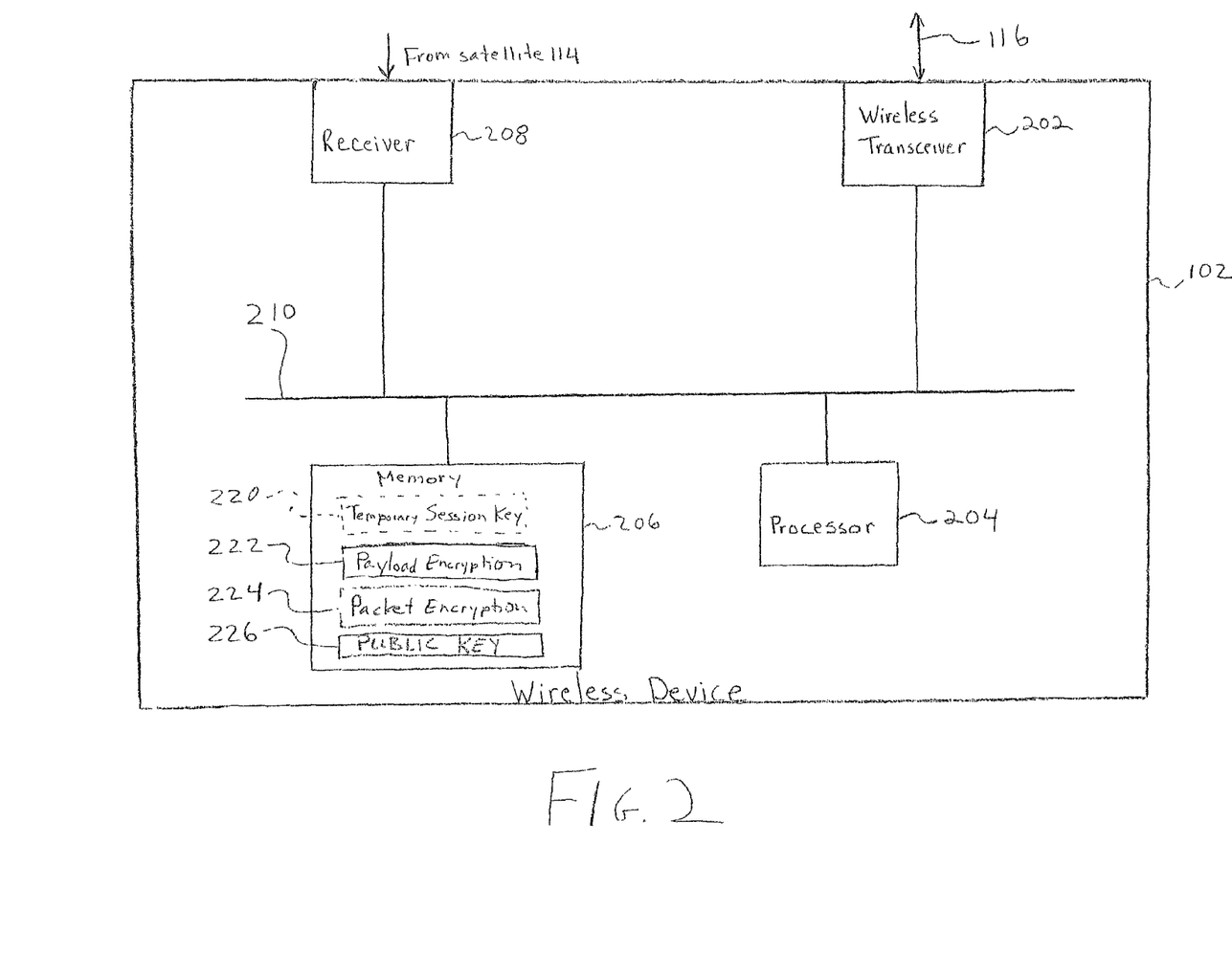
FIG. 2 is a block diagram illustrating details of the FIG. 1 wireless device.

FIG. 2 illustrates details of the wireless device 102. The wireless device 102 may include a wireless transceiver 202, a processor 204, a memory 206, and a receiver 208 all coupled by at least one bus 210. The wireless transceiver 202 generally functions to transmit data to and receive data from the base station 104 (FIG. 1) over the wireless link 116 (FIG. 1). In one embodiment, the wireless transceiver 202 comprises a CDPD modem, such as the CDPD modem sold under the part number NRM-6832 from Novatel, Inc. of Calgary, Alberta, Canada.

The receiver 208 may comprise a conventional GPS receiver for receiving GPS location information from the satellite 114 (FIG. 1). The GPS location information may comprise geographical location information associated with the geographical location of the wireless device 102. In one embodiment, the receiver 208 may comprise a GPS receiver sold under the part number SV6 by Trimble Navigation Limited of Sunnyvale, Calif.

Those skilled in the art will appreciate that the receiver 208 may be replaced with other types of data sources to permit the wireless device 102 to transmit information other than location information.

The processor 204 may comprise a microprocessor and, in a specific embodiment, the processor 204 may comprise the microprocessor sold under the part number M68000 by Motorola, Inc. of Schaumburg, Ill. The processor 204 is configured to process instructions from the memory 206 and data from the receiver 208 and the wireless transceiver 202.

The memory 206 may comprise a combination of volatile and non-volatile memory. In one embodiment, the memory 206 includes flash memory and RAM. The memory 206 includes a temporary session key 220, a payload encryption engine 222, a packet encryption engine 224, and a public key 226.

The temporary session key 220 may be stored in flash memory and may have a length of twenty-two bytes. The temporary session key 220 may be a symmetric session key that comprises numeric code that is used by the payload encryption engine 222 to encrypt payload information for security purposes. The payload encryption engine 222 uses the temporary session key 222 to encrypt a payload of data packets transmitted by the wireless device 102 during a session.

In one embodiment, the payload encryption engine 222 generates the temporary session key 220 using a random number on power-up. The server 110 (FIG. 1) may also request that the wireless device 102 start a new session at any time. Further, the payload encryption engine 222 may also start a new session as discussed below. In one embodiment, the payload encryption engine 322 uses a single temporary session key 220 to encrypt all packets during a session.

The payload encryption engine 222 encrypts the temporary session key 220 using the public key 226, which corresponds with a private key of the server 110 (FIG. 1). Once a session has been established with an associated temporary session key 222, the wireless device 102 may transmit a payload encrypted with the temporary session key 222.

Encrypting the temporary session key 220 with the public key 226 permits the wireless device 102 to send the temporary session key 220 to the server 110 over the link 116 (FIG. 1), through the gateway 106, and over the WAN 108, in an encrypted fashion. The wireless device 102 may send the encrypted temporary session key to the server 110 as part of a session establishment packet, details of which are described below. The server 110 then decrypts the encrypted temporary session key using a server private key, as discussed in more detail below.

The public key 226 is permanently stored in the memory 206, which eliminates the need to obtain the public key 226. Conventionally, to reliably obtain a public key, a user must interact with a third party, such as a Certificate Authority, to obtain a public key in a certified or reliable manner. In one embodiment, the wireless devices 102 are the only devices transmitting data packets to the server 110 using the public key 226 and, therefore, the public key 226 need only be known by the wireless devices 102. Permanently storing the public key 226 in the memory 206 provides the device 102 with the public key 226 without the delay or inefficiency due to obtaining a public key via a Certificate Authority. One example of a Certificate Authority is Verisign, Inc. of Mountain View, Calif.

The packet encryption engine 224 adds header information to the payload after the payload encryption engine 222 has encrypted the payload with the temporary session key 220 to form a data packet. In one embodiment, the header includes an identifier to indicate that the associated payload is encrypted. The packet encryption engine 224 then encrypts the entire data packet, such as by using conventional CDPD/iDEN protocols. In one embodiment, the packet encryption engine 224 may employ conventional encryption algorithms, such as RC4 or RC5 in encrypting the data packet, and may use another key.

Thus, the encryption engines 222 and 224 effectively encrypt the payload twice. The payload is first encrypted by the payload encryption engine 222 using the temporary session key 220 and is encrypted a second time by the packet encryption engine 224, which encrypts the entire data packet, including the payload, using another key. The header may only be encrypted one time, by the packet encryption engine 224. The operation of the wireless device 102 is described in more detail below with reference to FIG. 6.

Figure 3:
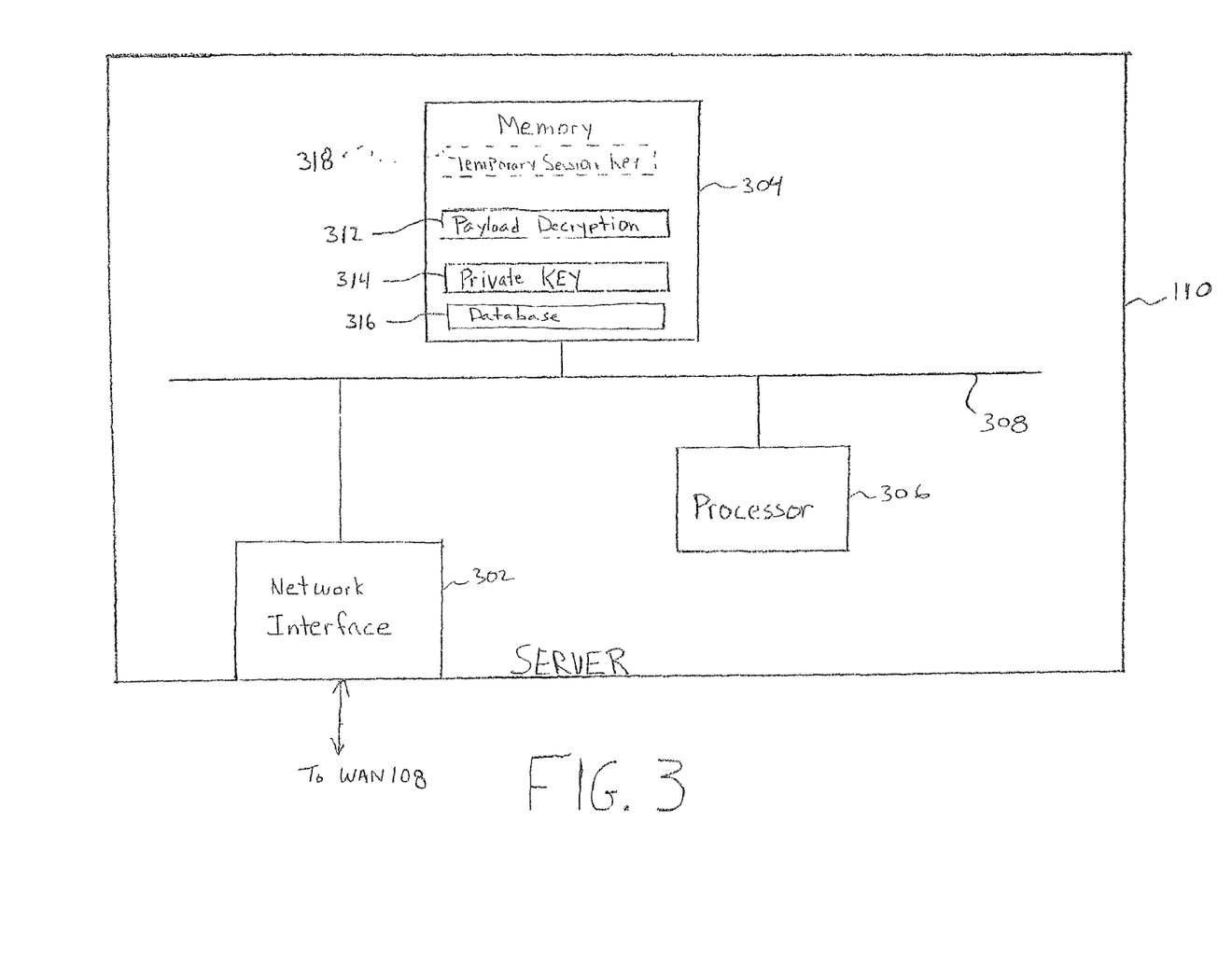
FIG. 3 is a block diagram illustrating details of the FIG. 1 server.

FIG. 3 illustrates details of the server 110 of FIG. 1. As shown, the server 110 includes a network interface 302, memory 304, and a data processor 306, all coupled by at least one bus 308. The network interface 302 may comprise any of a variety of network interfaces, such as an IP interface, and permits the server 110 to exchange data with other devices over the WAN 108. The data processor 306 may comprise any of a variety of data processors 306 suitable for use in WAN servers and is configured to execute instructions received from the network interface 302 and from the memory 304.

The memory 304 includes a payload decryption engine 312, a private key 314, a database 316, and a temporary session key 318. The payload decryption engine 312 generally decrypts payloads received from the wireless device 102 using the temporary session key 318 and may pass the decrypted payload to the database 316 for further processing. The private key 314 is a private part of a two-part key comprising the public key 226 (FIG. 2) and the private key 314.

The private key 314 is generally not transmitted over the WAN 108, but is used to decrypt data that has been encrypted by the associated public key 226.

The database 316 may include a list of all wireless devices, such as the wireless device 102 (FIG. 1), from which the server 110 is authorized to receive data transmissions. Thus, upon receipt of a data transmission, the database 316 determines whether the received data transmission was sent by an approved device by checking an identity of the source of the data transmission against a list of all wireless devices from which the server 110 is authorized to receive data transmissions. If the source of the data transmission does not correspond with a database entry associated with an approved device, the server 110 may disregard the received data transmission.

Moreover, the server 110 may request that the wireless device 102 commence a new session upon receipt of a transmission from an unauthorized device. Alternatively, the server 110 may request a new session based on other reasons, such as the expiration of a predetermined time period or the receipt of a predetermined number of packets.

The temporary session key 318 is identical to the temporary session key 222 shown in FIG. 2 and described above except that the temporary session key 318 is stored in the memory 318. The payload decryption engine 312 uses the temporary session key 318 to decode payloads transmitted by the wireless device 102 that have been encoded by an associated temporary session key, such at the temporary session key 222. Additional details regarding the server 110 are described below.

Figure 4:
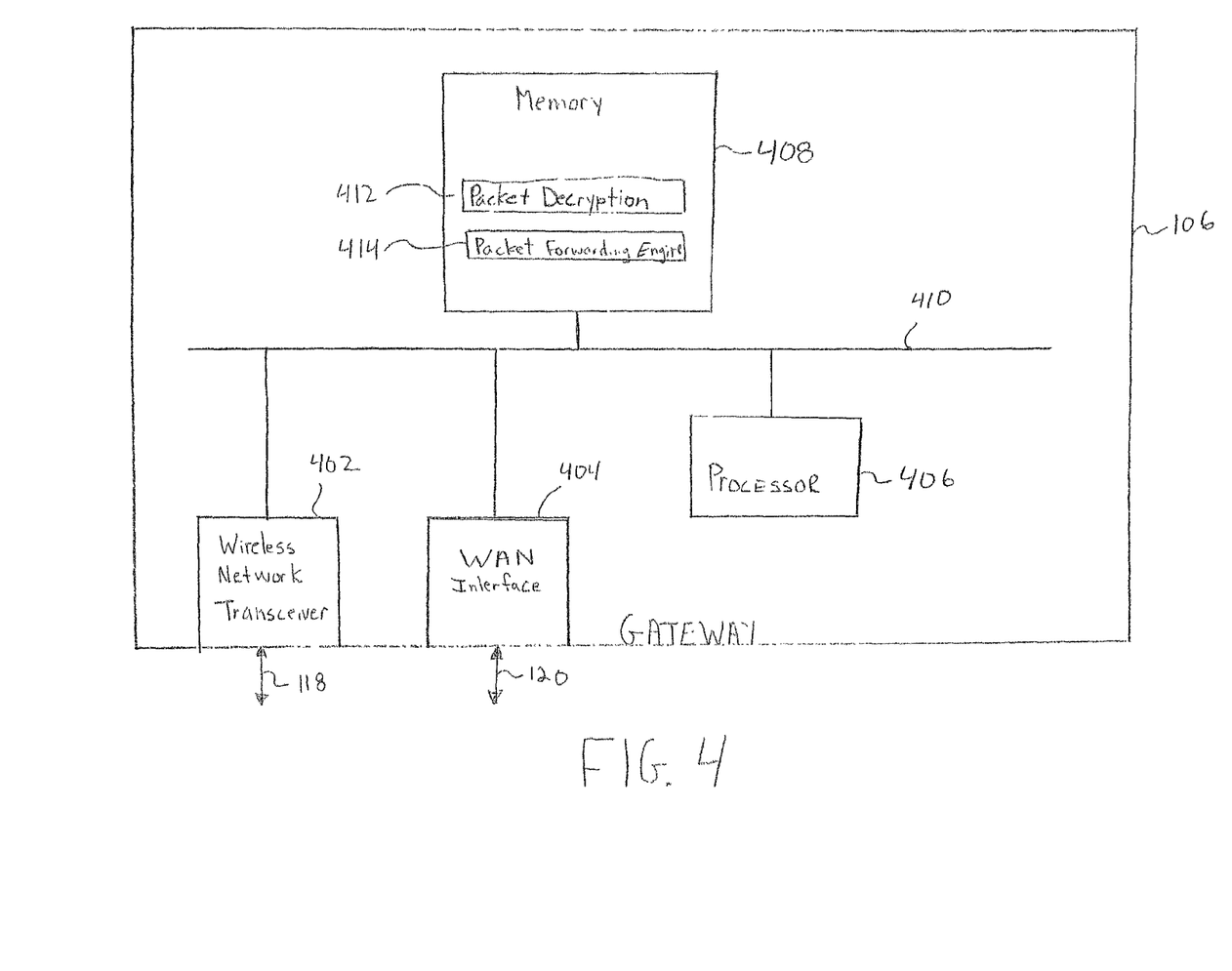
FIG. 4 is a block diagram illustrating details of the FIG. 1 gateway.

FIG. 4 illustrates details of the gateway 106 shown in FIG. 1. In general, the gateway device 106 receives data packets from the wireless device 102 (FIG. 1), performs packet decryption on the data packets, and forwards the packets that have been decrypted, but that still have encrypted payloads, over the WAN 108 (FIG. 1) to the server 110 (FIG. 1). The gateway 106 may include a wireless network transceiver 402, a WAN interface 404, a data processor 406, and memory 408 all coupled to each other by at least one bus 410. The memory 408 may comprise a combination of volatile and non-volatile memory and includes a packet decryption engine 412 and a packet forwarding engine 414.

The data processor 406 comprises a conventional data processor of the kind typically employed in gateway devices and is configured to process instructions from the wireless network transceiver 402, the WAN interface 404, and the memory 408. The wireless network transceiver 402 comprises a conventional wireless network transceiver and is configured to permit data to be exchanged between the bus 410 and the link 118 with the base station 104 (FIG. 1). The WAN interface 404 is also conventional and may comprise an IP interface for permitting the gateway 106 to exchange data with devices on the WAN 108 (FIG. 1).

The memory 408 includes a packet decryption engine 412 and a packet forwarding engine 414. The packet decryption engine 412 decrypts packets received from the wireless device 102 over the wireless network transceiver 402. In particular, the packet decryption engine 412 receives and decrypts data packets that have been encrypted by the packet encryption engine 224 (FIG. 2) of the wireless device 102.

The packet decryption engine 412 does not, however, decrypt the payload using a private session key. Rather, the packet decryption engine 412 decrypts the entire received packet, including header and payload portions, according to conventional packet decryption techniques, and may use a key other than the temporary session keys 220 and 318, to undo the encryption performed by the packet encryption engine 224.

After the decryption engine 412 decrypts the received data packet, the packet forwarding engine 414 forwards the decrypted data packet over the WAN 108. The packet forwarding engine 414 forwards the decrypted data packet in accordance with the data packet forwarding information found in a header of the decrypted data packet and packet forwarding data (not shown), such as a routing table, included in the packet forwarding engine 414 over the WAN interface 404.

FIGS. 5A-5E illustrate a payload 502 and header 504 as they exist in various stages between the wireless device 102 (FIGS. 1 and 2) and the server 110 (FIGS. 1 and 3). As those skilled in the art will appreciate, the payload 502 comprises message data and the header 504 comprises overhead and may include control and routing information.

Figures 5A, 5B:
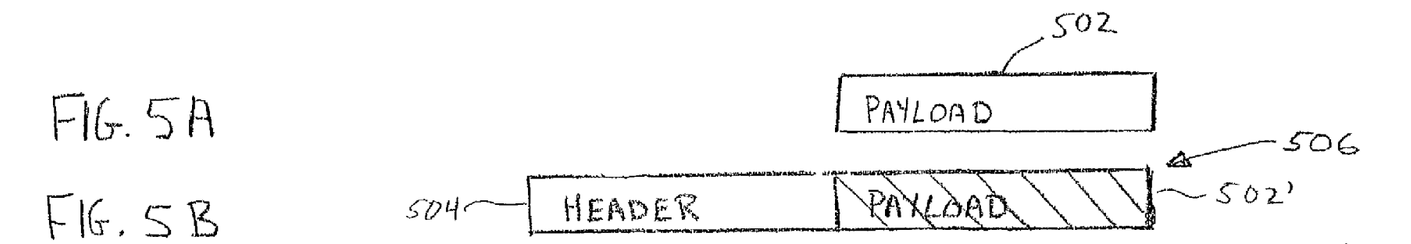
FIGS. 5A, 5B, 5C, 5D, and 5E illustrate a payload and associated header.

With reference to FIG. 5A, the wireless device 102 (FIG. 1) initially prepares the payload 502, which comprises the message data to be transmitted to the server 110. The payload 502 may include location information regarding the geographical location of the wireless device 102.

With reference to FIG. 5B, the payload encryption engine 222 (FIG. 2) of the wireless device 102 encrypts the payload 502 using the temporary session key 220 (FIG. 2) to form payload 502'. The packet encryption engine 224 (FIG. 2) then adds a header 504 to form a data packet 506. Thus, the data packet 506 of FIG. 5B has an unencrypted header 504 and a payload encrypted by the temporary session key 220. The cross-hatching of the payload 502' in FIG. 5B indicates that the payload 502' is encrypted with the temporary session key 220.

Figure 5C:
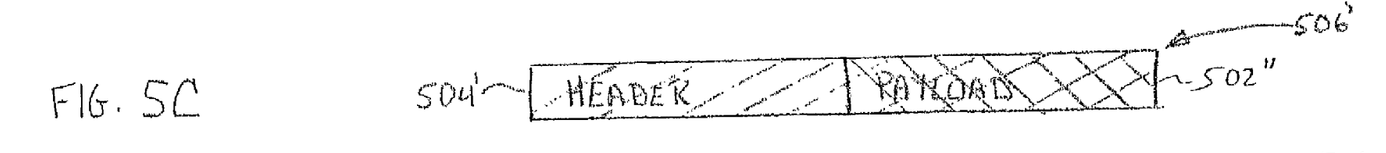

With reference to FIG. 5C, the packet encryption engine 224 (FIG. 2) of the wireless device 102 encrypts the data packet 506 (FIG. 5B), such as by using CDPD/iDEN, to form an encrypted data packet 506'. The encrypted data packet 506' thus includes an encrypted header 504' and a twice encrypted payload 502". The wireless device 102 (FIG. 1) then transmits the encrypted data packet 506' over the wireless link 116 (FIG. 1) and the base station 104 to the gateway 106. The cross-hatching of the header 504' and the payload 502" indicates that both the header 504' and the payload 502" are encrypted by the packet encryption engine 224 and that the payload 502" is also encrypted with the temporary session key 220.

Figure 5D:
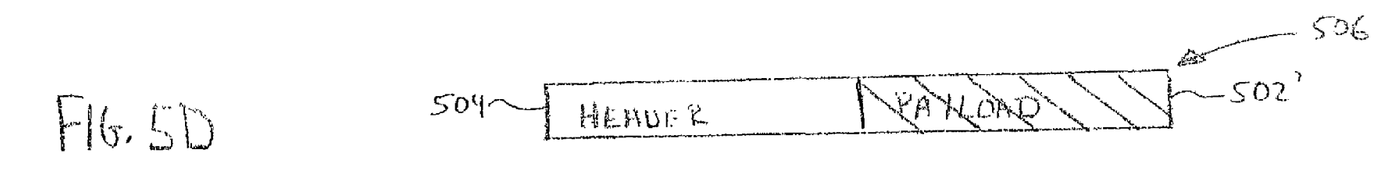

With reference to FIG. 5D, the packet decryption engine 412 (FIG. 4) of the gateway 106 decrypts the encrypted data packet 506' to form the data packet 506. The data packet 506 includes a decrypted header 504 and an encrypted payload 502'. The gateway 106 then forwards the data packet 506 over the WAN 108 (FIG. 1) to the server 110.

Figure 5E:
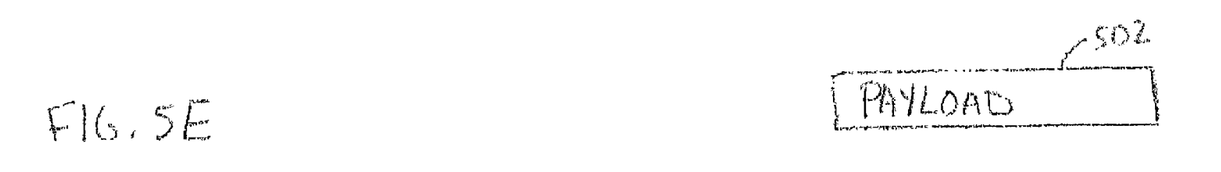

With reference to FIG. 5E, the payload decryption engine 312 (FIG. 3) of the server 110 (FIG. 1) removes the header 504 and decrypts the payload 502' using the temporary session key 318 (FIG. 3) to form the payload 502, which the server 110 may then process.

Figure 6:
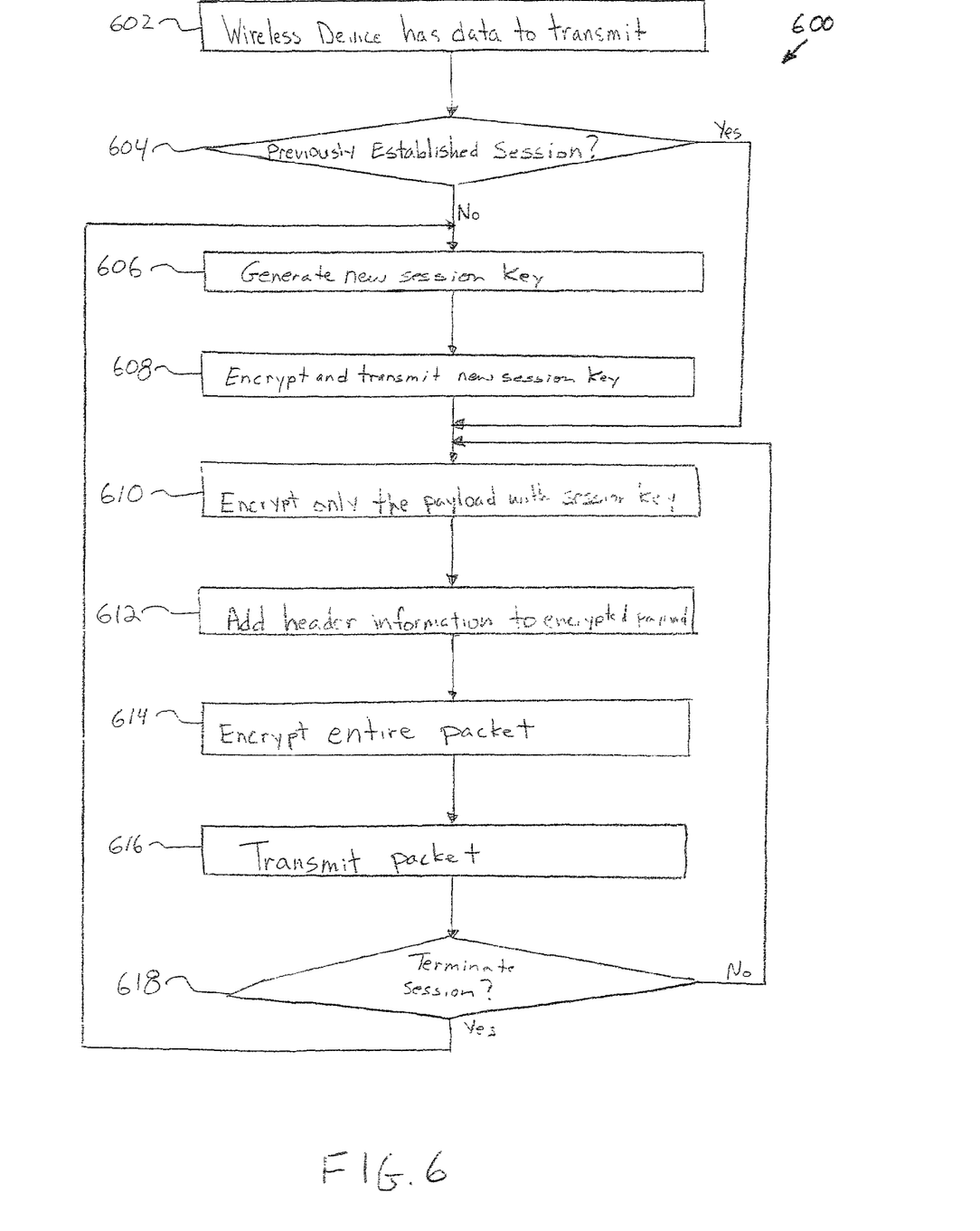
FIG. 6 is a flowchart illustrating a method in accordance with an embodiment of the present invention.

FIG. 6 is a flowchart 600 illustrating one embodiment of a method of operation of the wireless device 102. Initially, in block 602 the wireless device 102 has data, such as the payload 502 (FIG. 5A), to transmit. In one embodiment, the data to transmit may comprise data received by the wireless device 102 from the satellite 114 (FIG. 1) over the receiver 208 (FIG. 2). The payload encryption engine 222 next determines, pursuant to block 604, whether a previously established session is ongoing. If the payload encryption engine 222 determines that there is no ongoing previously established session, execution proceeds to block 606, otherwise execution proceeds to block 608.

In block 606, the payload encryption engine 222 (FIG. 2) creates a new session by generating a new temporary session key 220, such as by using a conventional random number generator (not shown).

In block 608, the payload encryption engine 222 (FIG. 2) encrypts the new temporary session key 220 using the public key 226 and transmits the encrypted new temporary session key to the server 110 (FIG. 1) over the wireless link 116 and the WAN 108 in the form of a session establishment packet. The session establishment packet may comprise a header and a payload. Pursuant to one embodiment, the session establishment header may include the source of the session establishment packet and a session sequence number, which is incremented for each new session. The session establishment payload includes the new temporary session key 220 encrypted by the public key 226.

The server 110, in turn, receives the encrypted new temporary session key and inspects the session sequence number to verify that the session sequence number is one increment higher than the session sequence number of the previous session. If the server 110 is unable to verify the session sequence number, the server 110 may disregard the session establishment packet in its entirety. Verifying the session sequence number as described may be helpful in limiting replays and replay attacks by ensuring that the session establishment packet is, indeed, a new session establishment packet and not a replay of a previously-used session establishment packet.

After verifying the session sequence number, the server 110 (FIG. 1) decrypts the encrypted new temporary session key using the private key 314 (FIG. 3) and temporarily stores the decrypted new session key as temporary session key 318 (FIG. 3). After storing the temporary session key 318, the server 110 may transmit an acknowledgment message to the wireless device 102 (FIG. 1) indicating receipt of the new temporary session key.

The temporary session keys 220 (FIG. 2) and 318 (FIG. 3) may comprise symmetric keys such that the temporary session keys 220 and 318 are identical. Use of a symmetric key, also known as a "secret key," for the temporary session key is advantageous in that symmetric keys are generally easy to implement, have relatively small code sizes, execute quickly, and may be used with a wide variety of well-known conventional algorithms. Examples of such symmetric key algorithms include DES (Data Encryption Standard), DESX, and the like.

In block 610, the payload encryption engine 222 encrypts a payload with the temporary session key 220 using a conventional encryption algorithm, such as the DESX encryption algorithm. Pursuant to one embodiment, the payload encryption engine 222 also includes a packet sequence number within each payload before encrypting the payload with the temporary session key 220. The packet sequence number may reset to zero at the beginning of each new session and increments for each new payload or data packet during the session.

Next, pursuant to block 612, the packet encryption engine 224 adds a header 504 (FIG. 5) to form a data packet 506 (FIG. 5B).

In block 614, the packet encryption engine 224 encrypts the entire packet 506 using an encryption algorithm, such as RC4 or the like, to form the encrypted packet 506' of FIG. 5C.

In block 616, the wireless device 102 (FIG. 1) transmits the encrypted packet 506' (FIG. 5C) over the link 116 (FIG. 1) using the wireless transceiver 202 (FIG. 2).

In block 618, the payload encryption engine 222 determines whether to terminate the current session. The payload encryption engine 222 may determine to terminate the current session based on, for example: the expiration of a predetermined time period, the transmission of a predetermined number of data packets, receipt of a predetermined number of errors, receipt of a request for a new session from the server 110.

If the payload encryption engine 222 determines not to terminate the current session at block 618, execution proceeds to block 610, otherwise execution proceeds to block 606.

Figure 7:
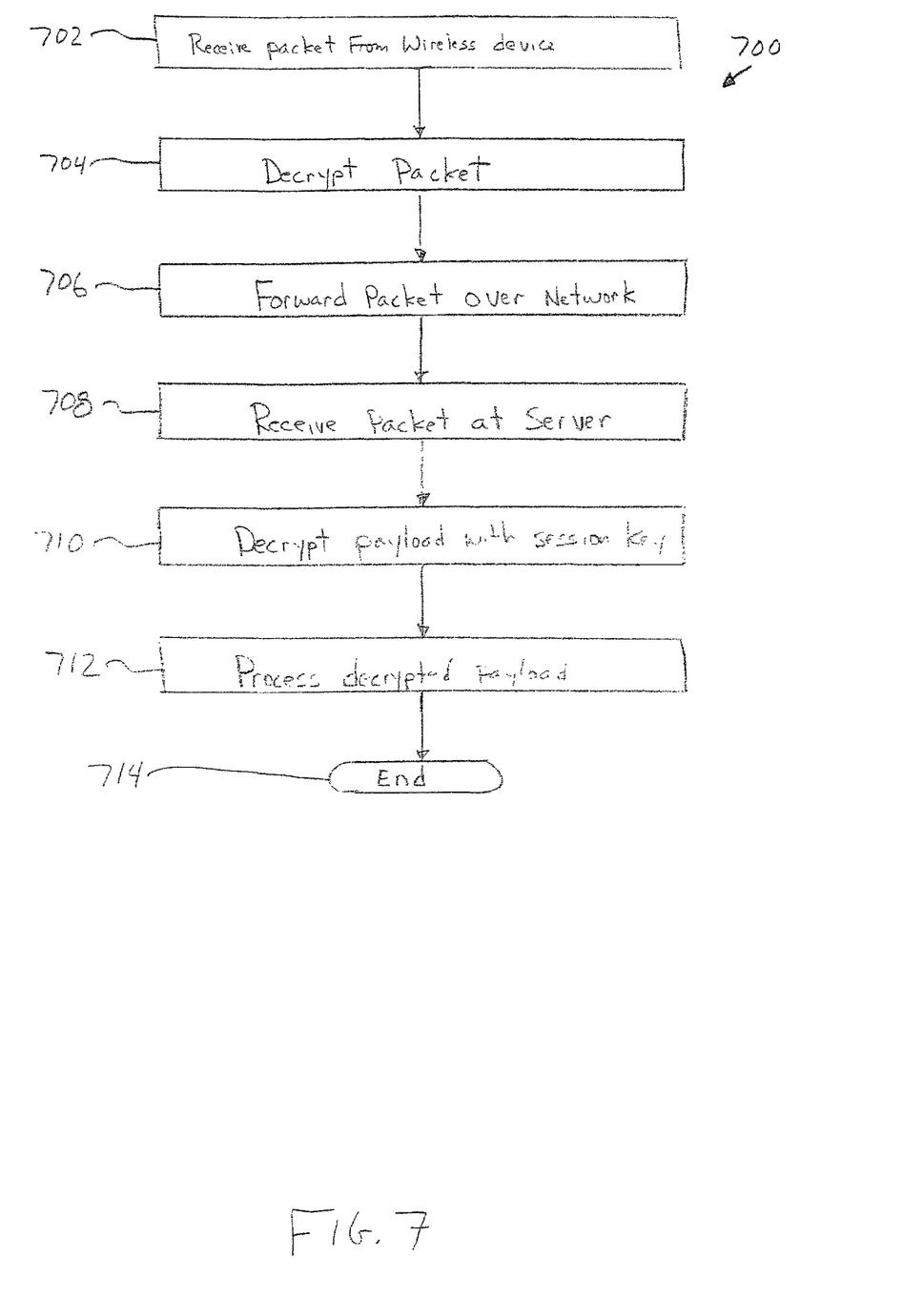
FIG. 7 is a flowchart illustrating a method in accordance with an embodiment of the present invention.

FIG. 7 is a flowchart 700 illustrating one embodiment of the operation of the gateway 106 and the server 110 of FIG. 1. In block 702, the gateway 106 receives an encrypted data packet from the wireless device 102 via the wireless network transceiver 402. The data packet received by the gateway 106 pursuant to block 702 may take the form of the data packet 506' shown in FIG. 5C.

In block 704, the packet decryption engine 412 (FIG. 4) of the gateway 106 decrypts the encrypted data packet 506' (FIG. 5C) to form the data packet 506 illustrated in FIG. 5D and described above.

In block 706, the packet forwarding engine 414 (FIG. 4) of the gateway 106 then forwards the data packet 506 (FIG. 5D) over the WAN 108 (FIG. 1) to the server 110 in accordance with the information found in the header 504 (FIG. 5D).

In block 708, the server 110 (FIG. 1) receives the data packet 506 (FIG. 5D) via the network interface 302 (FIG. 3). Next, in block 710, the payload decryption engine 312 (FIG. 3) of the server 110 removes the header 504 (FIG. 5D) and decrypts the encrypted payload 502' using the temporary session key 318 (FIG. 3) to form the decrypted payload 502 (FIG. 5E).

Pursuant to one embodiment, the payload decryption engine 312 (FIG. 3) also inspects and verifies the packet sequence number. The payload encryption engine 312 verifies the packet sequence number is zero or some other previously agreed upon nominal number for a first data packet of a session. The payload decryption engine 312 may also verify the packet sequence number if the number is one increment higher than the packet sequence number of a previous data packet if the received data packet is not the first data packet of a session. If the payload decryption engine 312 does not verify the packet sequence number, the payload decryption engine 312 may disregard the received packet in its entirety. Use of the packet sequence number as described above may limit replay of transmitted data packets and replay attacks.

In block 712, the database 316 (FIG. 3) may process the decrypted payload 502 (FIG. 5E). Pursuant to one embodiment, the server 110 (FIG. 1) determines whether the payload 502 was transmitted by an authorized device by checking the information in the payload 502 against information in the database 316. Pursuant to another embodiment, the server 110 makes the payload information available to the client 112 (FIG. 1) by transmitting the payload information over the WAN 108, such as by SSL protocol or the like. The server 110 may also perform cyclical redundancy checking (CRC) of the received data packet to ensure that the payload was transmitted without error.

In another embodiment, the server 110 (FIG. 1) may transmit data packets having payloads encrypted by the temporary session key 318 over the WAN 108 and the wireless link 116 to the wireless device 102.

The above detailed description and accompanying drawings are provided to illustrate the specific embodiments of the present invention and are not intended to be limiting. Numerous modifications and variations within the scope of the present invention are possible. The present invention is particularly pointed out and distinctly claimed in the following claims.

What is claimed is:

1. A method of transmitting secured data, the method comprising:
utilizing a first key to encrypt a payload by a mobile device;
adding a header to the encrypted payload to form a data packet by said mobile device, wherein said payload comprises GPS location of said mobile device;
utilizing a second key to encrypt the first key by said mobile device;
utilizing a third key to encrypt the data packet by said mobile device;
transmitting the encrypted first key separate from the encrypted data packet to a wireline device in a first transmission from said mobile device, wherein the wireline device decrypts the encrypted first key;
transmitting only the encrypted data packet without said first key over a wireless link to a gateway in a second transmission from said mobile device, wherein the gateway decrypts the encrypted data packet to recreate the encrypted payload and the header, and forwards the encrypted payload and the header to the wireline device over an open network; and
utilizing the wireline device and the first key from the first transmission to decrypt the encrypted payload.

2. The method of claim 1, wherein the first key comprises a symmetric key.

3. The method of claim 1, further comprising:
transmitting the encrypted first key to the wireline device, wherein the wireline device decrypts the encrypted first key using a private key associated with the second key.

4. The method of claim 1, wherein the third key comprises a symmetric session key.

5. A device for transmitting secured data over a wireless link, the device comprising:
an encryption engine which generates a first key, encrypts a payload according to the first key, adds a header to the encrypted payload to form a data packet, encrypts the first key according to a second key, and encrypts the data packet according to a third key, wherein the payload comprises GPS location information obtained by the device and regarding a geographical location of the device; and
a wireless transceiver coupled to the encryption engine, the wireless transceiver transmitting the encrypted first key separate from the encrypted data packet to a server in a first transmission from the device and transmitting only the encrypted data packet without said first key over the wireless link to a gateway in a second transmission from the device, wherein the gateway decrypts the encrypted data packet to recreate the encrypted payload and the header, and forwards the encrypted payload and the header to the server over an open network;
wherein the server decrypts the encrypted first key received in the first transmission and decrypts the encrypted payload of the second transmission using the decrypted first key.

6. The device of claim 5, wherein the first key comprises a symmetric key.

7. A method for secured communication between a mobile device and a server on a wide area network, the method comprising:
encrypting a payload at the mobile device using a first session key, wherein the payload includes GPS location information obtained by the mobile device and associated with a geographical location of the mobile device;
encrypting the first session key at the mobile device using a public key;
transmitting the encrypted first session key separate from an encrypted data packet to the server over a wireless link in a first transmission from the mobile device;
decrypting the encrypted first session key at the server;
adding a header to the encrypted payload to form a data packet at the mobile device;
encrypting the data packet according to a second session key configured for secured communications over the wireless link; and
transmitting only the encrypted data packet without said first key in a second transmission from the mobile device to a gateway which decrypts the encrypted data packet to recreate the encrypted payload and the header, and forwards the encrypted payload and the header to the server;
wherein the server utilizes the decrypted first session key, decrypted from the first transmission, to decrypt the encrypted payload.

8. The method of claim 7 wherein the decrypting the encrypted first session key at the server further comprises:
decrypting the encrypted first session key at the server using a private key associated with the public key.

9. The method of claim 7, further comprising:
generating the first session key at the mobile device based on a random number.

10. The method of claim 7, wherein the encrypting the payload at the mobile device using the first session key further comprises:
encrypting the payload at the mobile device using the first session key, wherein the first session key employs an encryption algorithm selected from a group of encryption algorithms consisting of DESX and DES.

11. The method of claim 1, further comprising:
implementing an encryption algorithm selected from a group of encryption algorithms consisting of DESX and DES.

12. The method of claim 1, wherein the data packet includes GPS location information obtained by the wireless device and associated with a geographical location of the wireless device.

13. The method of claim 1, further comprising:
utilizing a random number to generate the first key.

14. The device of claim 5, further comprising:
a memory coupled to the encryption engine, wherein the memory stores the second key, and wherein the encryption engine accesses the second key from the memory.

15. A non-transitory computer readable storage medium comprising program instructions for performing a method comprising:
encrypting a payload according to a first key, wherein said payload comprises GPS location of a mobile device;
adding a header to the encrypted payload to form a data packet;
encrypting the first key according to a second key;
encrypting the data packet according to a third key configured for secured communications over a wireless link;
transmitting the encrypted first key separate from the encrypted data packet to a server in a first transmission from said mobile device; and
transmitting only the encrypted data packet without said first key over the wireless link to a gateway in a second transmission from the mobile device, wherein the gateway decrypts the encrypted data packet to recreate the encrypted payload and the header, and forwards the encrypted payload and the header to the server, and wherein the server decrypts the encrypted first key received in the first transmission and decrypts the encrypted payload using the decrypted first key.

16. The computer readable storage medium of claim 15, wherein the first key comprises a symmetric key.

17. The computer readable storage medium of claim 15, wherein the method further comprises:
receiving the data packet at the gateway;
decrypting the data packet at the gateway according to the third key;
forwarding the encrypted payload to the server;
receiving the encrypted first key at the server;
decrypting the encrypted first key using a fourth key; and
decrypting the payload according to the decrypted first key.

18. The computer readable storage medium of claim 15, wherein the first key comprises a symmetric session key.

19. The computer readable storage medium of claim 15, wherein the method further comprises:
implementing an encryption algorithm selected from a group of encryption algorithms consisting of DESX and DES.

20. The computer readable storage medium of claim 18, wherein the symmetric session key is generated based on a random number.

* * * * *